(12) United States Patent
Yang et al.

(10) Patent No.: US 10,133,947 B2
(45) Date of Patent: Nov. 20, 2018

(54) OBJECT DETECTION USING LOCATION DATA AND SCALE SPACE REPRESENTATIONS OF IMAGE DATA

(71) Applicant: QUALCOMM Incorporated, San Diego, CA (US)

(72) Inventors: Ruiduo Yang, San Diego, CA (US); Ning Bi, San Diego, CA (US); Sichao Yang, Basking Ridge, NJ (US); Xinzhou Wu, Hillsborough, NJ (US); Feng Guo, San Diego, CA (US); Jianfeng Ren, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 14/598,892

(22) Filed: Jan. 16, 2015

(65) Prior Publication Data

US 2016/0210525 A1 Jul. 21, 2016

(51) Int. Cl.
| | | |
|---|---|---|
| *G06K 9/00* | (2006.01) | |
| *G06K 9/20* | (2006.01) | |
| *G06K 9/32* | (2006.01) | |
| *G06K 9/42* | (2006.01) | |
| *G06K 9/68* | (2006.01) | |

(52) U.S. Cl.
CPC ......... *G06K 9/2054* (2013.01); *G06K 9/0063* (2013.01); *G06K 9/00369* (2013.01); *G06K 9/00791* (2013.01); *G06K 9/00805* (2013.01); *G06K 9/3233* (2013.01); *G06K 9/42* (2013.01); *G06K 9/6857* (2013.01)

(58) Field of Classification Search
None
See application file for complete search history.

(56) References Cited

U.S. PATENT DOCUMENTS

| | | | |
|---|---|---|---|
| 5,617,085 A | 4/1997 | Tsutsumi et al. | |
| 7,804,982 B2 * | 9/2010 | Howard | G06F 17/30011 382/115 |
| 9,213,901 B2 * | 12/2015 | Bernal | G06K 9/00771 |
| 9,460,517 B2 * | 10/2016 | Fathi | G06T 7/579 |
| 9,501,725 B2 * | 11/2016 | Vrcelj | G06K 9/78 |

(Continued)

FOREIGN PATENT DOCUMENTS

| | | |
|---|---|---|
| EP | 2615596 A1 | 7/2013 |
| EP | 2639781 A1 | 9/2013 |
| WO | 03001472 A1 | 1/2003 |

OTHER PUBLICATIONS

"Scale Space," Wikipedia, the Free Encyclopedia, retrieved from http://en.wikipedia.org/w/index.php?title=scale_space&printable=yes, retrieved on Nov. 4, 2014, Wikimedia Foundation, San Francisco, CA, 11 pages.

(Continued)

*Primary Examiner* — Nancy Bitar
(74) *Attorney, Agent, or Firm* — Qualcomm Incorporated—Toler

(57) ABSTRACT

An apparatus includes an object detector configured to receive image data of a scene viewed from the apparatus and including an object. The image data is associated with multiple scale space representations of the scene. The object detector is configured to detect the object responsive to location data and a first scale space representation of the multiple scale space representations.

29 Claims, 8 Drawing Sheets

(56) References Cited

U.S. PATENT DOCUMENTS

| | | | |
|---|---|---|---|
| 9,754,163 B2* | 9/2017 | Segalovitz | G06K 9/00442 |
| 9,886,774 B2* | 2/2018 | Fathi | G06T 7/579 |
| 9,928,418 B2* | 3/2018 | Segalovitz | G06K 9/00442 |
| 2004/0178945 A1* | 9/2004 | Buchanan | G01S 11/12 |
| | | | 342/70 |
| 2005/0004762 A1 | 1/2005 | Takahama et al. | |
| 2005/0096525 A1* | 5/2005 | Okada | G06T 7/11 |
| | | | 600/407 |
| 2008/0071559 A1* | 3/2008 | Arrasvuori | G06Q 30/06 |
| | | | 705/26.1 |
| 2010/0253492 A1 | 10/2010 | Seder et al. | |
| 2013/0223686 A1* | 8/2013 | Shimizu | G08G 1/166 |
| | | | 382/103 |
| 2013/0335569 A1* | 12/2013 | Einecke | G01S 13/867 |
| | | | 348/148 |
| 2014/0035909 A1* | 2/2014 | Abramoff | G06T 15/00 |
| | | | 345/419 |
| 2014/0064626 A1* | 3/2014 | Chon | G06T 5/00 |
| | | | 382/209 |
| 2014/0282220 A1* | 9/2014 | Wantland | G06F 3/04845 |
| | | | 715/782 |
| 2015/0269785 A1* | 9/2015 | Bell | G06T 19/003 |
| | | | 345/427 |

OTHER PUBLICATIONS

Nordahl, T. B., "Enabling Fast-paced Mobile News Acquisition, Roaming Live & Reality/EFP Applications," A JVC Professional/Broadcast Report issued for the NAB-2013, The ProHD 2013 Report, GY-HM650, 2013, JVC, Wayne, NJ, pp. 1-20.

Suzuki, T., et al., "Vehicle Teleoperation Using 3D Maps and GPS Time Synchronization," IEEE Computer Graphics and Applications, Sep./Oct. 2013, vol. 33, No. 5, IEEE, Piscataway, NJ, pp. 82-88.

International Search Report and Written Opinion for International Application No. PCT/US2015/065538, ISA/EPO, dated Mar. 21, 2016, 13 pages.

Olmeda, D., et al., "Far Infrared Pedestrian Detection and Tracking for Night Driving," Robotica, Jun. 2011, vol. 29, No. 04, Cambridge University Press, Cambridge, United Kingdom, pp. 495-505.

Brehar, R., et al., "Scan Window Based Pedestrian Recognition Methods Improvement by Search Space and Scale Reduction," IEEE Intelligent Vehicles Symposium, Jun. 2014, vol. IV, IEEE, Piscataway, NJ, pp. 529-534.

* cited by examiner

OBJECT DETECTION USING LOCATION DATA AND SCALE SPACE REPRESENTATIONS OF IMAGE DATA

This disclosure is generally related to object detection. More specifically, this disclosure relates to object detection in response to image data and location data.

I. DESCRIPTION OF RELATED ART

A device may perform object detection operations using an image-based technique. For example, a camera may be mounted on a vehicle or incorporated in an electronic device, and the camera may supply image data to a processor. The processor may execute a computer vision application to analyze (or "scan") the image data to detect an object, such as an obstacle (e.g., a pedestrian, a tree, livestock, game, and/or another object) that is within or near the field of travel of the vehicle or mobile device.

In some circumstances, image-based object detection may be slow and ineffective. For example, an image "search" to recognize objects in an image may involve multiple time-consuming operations, such as image segmenting and windowing operations. Further, image-based object detection may be associated with a large range of uncertainty (or a large margin of error), which may cause detected object locations to be unreliable. These issues can frustrate the intended purpose for the object detection. As an example, in vehicular applications, image-based object detection may occur too slowly to enable the vehicle to slow, stop or to otherwise change course in time to avoid an obstacle.

Some devices may use location-based information, such as radar information, to detect objects. However, location-based information may be subject to a large range of uncertainty (e.g., such devices may have a large margin of error).

II. SUMMARY

Object detection may be performed using location data and scale space representations of image data. Each of the scale space representations may be a different resolution version of the image data. To illustrate, a device, for example, a vehicle or electronic device, may include an image sensor (e.g., a camera) configured to generate the image data. The device may also include or receive location data associated with an object to be detected and/or indicative of one or more areas in a scene where the object may be present. For example, location data may be received from a location sensor (e.g., a radar device, a global positioning system (GPS) device, etc.) that is configured to generate the location data. The location sensor can be coupled to the image sensing device or separate from the image sensing device. In another example, location data may correspond to one or more areas of a three-dimensional (3D) map indicative of where an object of interest (e.g., an object to be detected) may be present, such as an area of a scene or image that is above a road or ground surface. In some instances, more than one area of a scene may be identified by a 3D map and received as location data. For example, it may be desirable to detect objects on both left and right sides of a driving lane. In such devices, instead of searching all of the image data to detect an object (e.g., a pedestrian, a tree, livestock, game, and/or another object), a device (e.g., a processor) may search an overlap, intersection, or convergence of the location data and a scale space representation of the image data to detect the object. The device may be configured to search one or more scale space representations to detect the object, and different scale space representations may be searched to detect different objects. Searching the overlap or intersection of the location data and one or more scale space representations of the image data may be less computationally complex than other techniques (e.g., a "brute force" or complete search of all image data) and thus more efficient than other object detection techniques that do not consider location data.

As an illustrative, non-limiting example, a vehicle may perform pedestrian detection. To detect a pedestrian, the vehicle may utilize model-based object detection, where the model assumes that the height of objects of interest in image data provided by the camera will be less than or equal to a particular number of pixels (e.g., less than or equal to 100 pixels in height). When a pedestrian is close to the vehicle, the height of the pedestrian may be over 100 pixels in height, and as a result, the model may not be able to successfully detect the pedestrian. To detect the pedestrian, model-based object detection may be re-executed on a downsampled scale space representation of the image data. For example, if the height of the pedestrian is 180 pixels in the original (e.g., full-resolution) image, then the height of the pedestrian will be 90 pixels in a scale space representation that is downsampled by a factor of 2, and the model-based object detection may successfully detect the pedestrian in the downsampled image. Thus, to successfully detect objects (e.g., pedestrians) at varying distances, the vehicle may perform object detection on multiple scale space representations of the image data captured by the camera (e.g., a "high" or "full" resolution representation, a "medium" resolution representation, a "low" resolution representation, etc.). It should be noted that the present disclosure is not limited to object detection for vehicles. In various embodiments, object detection may be performed at and/or based on images captured by an image sensor of an electronic device, a mobile device, a personal mounted camera, a head mounted display, or an aerial vehicle, as illustrative non-limiting examples.

Iteratively searching each of multiple scale space representations in their entirety may be time-consuming. In accordance with the described techniques, an object detector may skip searching scale space representations that do not intersect or overlap with a probable location of an object (e.g., a pedestrian). Further, when a scale space representation overlaps the probable location of the object, the search may be restricted to an area of interest corresponding to the overlap. The probable location of the object may be provided by a location sensor that is part of the vehicle or that is separate from the vehicle. Additionally, the probable location of the object may be based at least in part on one or more areas of a 3D map where the object may be present. It is to be understood that as used herein, detecting an object can include detecting a representation of the object in image data (or in a scale space representation of the image data), detecting the actual physical object (e.g., based on ultrasound, radar, etc.), or both.

In a particular aspect, an apparatus includes an object detector configured to receive location data and image data of a scene from an image sensor. The scene is viewed from a vehicle and includes an object. The image data is associated with (e.g., can be used to generate) multiple scale space representations of the scene. The object detector is configured to detect the object responsive to the location data and a first scale space representation of the multiple scale space representations.

In another particular aspect, a method includes receiving from an image sensor, at a processor, image data of a scene viewed from an apparatus and including an object. The image data is associated with multiple scale space representations of the scene. The method also includes receiving, at the processor, location data associated with the object or indicative of an area where the object may be present. The method further includes identifying, at the processor, a search area of a first scale space representation of the multiple scale space representations based on an overlap between the first scale space representation and the location data. The method includes performing, at the processor, object detection in the search area of the first scale space representation.

In another particular aspect, an apparatus includes means for receiving image data of a scene viewed from the apparatus and including an object, where the image data is associated with multiple scale space representations of the scene. The apparatus further includes means for processing. The means for processing is configured to identify a search area of a first scale space representation of the multiple scale space representations based on an overlap between the first scale space representation and location data associated with the object or indicative of an area where the object may be present. The means for processing is also configured to perform object detection in the search area of the first scale space representation.

In another particular aspect, a computer-readable storage device stores instructions executable by a processor to cause the processor to receive, from an image sensor, image data of a scene viewed from an apparatus and including an object. The image data is associated with multiple scale space representations of the scene. The instructions are also executable to receive location data associated with the object or indicative of an area where the object may be present, and to identify a search area of a first scale space representation of the multiple scale space representations based on an overlap between the first scale space representation and the location data. The instructions are further executable to perform object detection in the search area of the first scale space representation.

One particular advantage provided by at least one of the disclosed embodiments is that a time of object detection that is performed on image data may be decreased by using location data that is associated with the object or that indicates an area where the object may be present. For example, object detection may not be performed on scale space representation(s) that do not intersect or overlap the location data, and object detection on scale space representation(s) that intersect or overlap the location data may be limited to the overlapping or intersecting area(s) of interest. Other aspects, advantages, and features of the present disclosure will become apparent after review of the entire application, including the following sections: Brief Description of the Drawings, Detailed Description, and the Claims.

III. BRIEF DESCRIPTION OF THE DRAWINGS

FIG. 1 is a diagram that depicts an illustrative system that is operable to perform object detection using location data and scale space representations of image data;

FIGS. 2A, 2B, 2C, and 2D are diagrams that depict illustrative examples of operation of the system of FIG. 1;

IV. DETAILED DESCRIPTION

Figure 1:
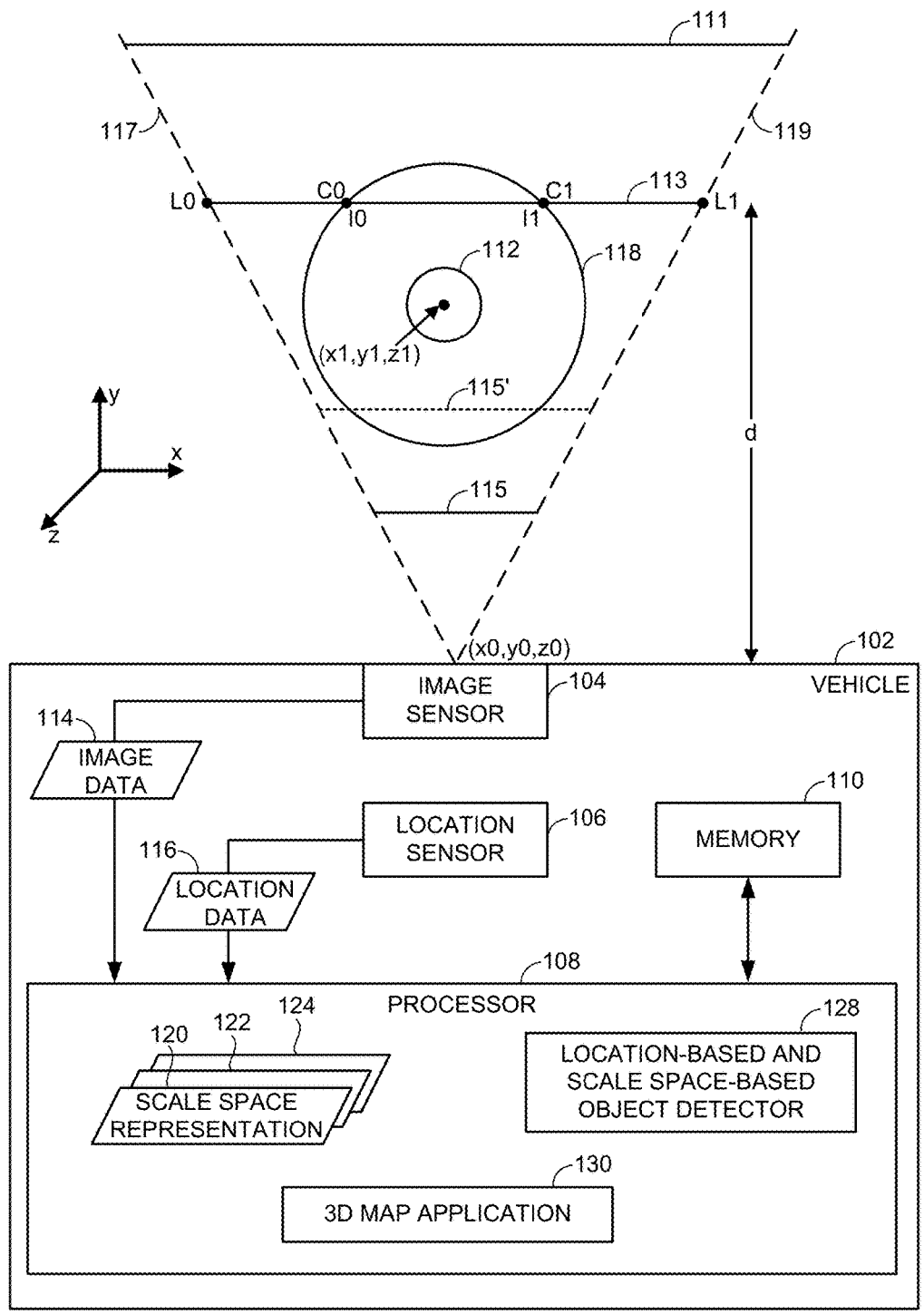

FIG. 1 depicts a particular illustrative embodiment of a system that is configured to perform object detection. In the example of FIG. 1, the object detection is performed at a vehicle 102. However, it should be noted that the present disclosure is not to be limited as such. The object detection devices, methods, systems, etc. disclosed herein can be implemented in alternative environments to detect objects in traffic, in a field of view, etc. For example, one or more functions described herein may be implemented in electronic devices, mobile devices, gaming consoles, automotive system consoles (e.g., ADAS), wearable devices (e.g., personal mounted cameras), head mounted displays, etc. Additional examples include, but are not limited to, robots or robotic devices, unmanned aerial vehicles (UAVs), and drones. In the example of FIG. 1, the vehicle 102 may be a motor vehicle (e.g., a car, a truck, a motorcycle, a bus, or a train), a watercraft (e.g., a ship or a boat), an aircraft (e.g., an airplane or a helicopter), a spacecraft (e.g., a space shuttle), a bicycle, or another vehicle. The vehicle 102 may be a wheeled vehicle, a tracked vehicle, a railed vehicle, an airborne vehicle, or a skied vehicle, as illustrative examples. In some cases, the vehicle 102 may be operated by one or more drivers. For example, the vehicle 102 may include an advanced driving assistance system (ADAS) configured to assist a driver of the vehicle 102. In other cases, the vehicle 102 may be a computer-controlled vehicle. Furthermore, although the objection detection in the example system of FIG. 1 is performed at the vehicle 102, it should be understood that in other examples the object detection disclosed herein can be performed in the "cloud" or outside of the vehicle 102. For example, a vehicle or other electronic device could provide location data and/or image data to another device to perform the object detection.

The vehicle 102 (e.g., an ADAS of the vehicle 102) may include one or more image sensors, such as an illustrative image sensor 104. The image sensor 104 may include a camera, such as a charge-coupled device (CCD)-based camera and/or a complementary metal-oxide-semiconductor (CMOS)-based camera. In alternative embodiments, the image sensor 104 may include a different type of sensor (e.g., infrared).

In the example of FIG. 1, the vehicle 102 further includes one or more location sensors, such as an illustrative location sensor 106. The location sensor 106 may include a radar device, a light detection and ranging (lidar) device, a global positioning system (GPS) device, an ultrasound device, and/or a communication device, such as a dedicated short-range communication (DSRC) device used in a vehicular communication network, as illustrative examples.

In the example of FIG. 1, a triangular field of view of the image sensor 104 is shown. It should be noted that the field of view of the image sensor 104 may be determined in various ways. As an illustrative non-limiting example, the image sensor 104 (or an apparatus including the image sensor 104) may include a GPS transceiver, and the field of view may be determined based on a temporal difference between two GPS locations of the image sensor 104 (or apparatus). A difference between the two GPS locations may correspond to a center line of the triangular field of view or to a direction of travel of the image sensor 104. As another illustrative non-limiting example, the direction of the image sensor 104 may be determined based on a motion sensor (e.g., accelerometer) that is coupled to the image sensor 104 or included in an apparatus that includes the image sensor 104, such as a vehicle, computing device, or other apparatus. Thus, the field of view and direction of the image sensor 104 may be determined even if not known a priori.

The vehicle 102 may further include a processor 108 and a memory 110. The memory 110 may store instructions and data accessible by the processor 108. The processor 108 may include a central processor unit (CPU), a digital signal processor (DSP), an application-specific integrated circuit (ASIC), an electronic control unit (ECU), another processing device, or a combination thereof. The processor 108 may include an object detector 128, such as a location data-based and scale space-based object detector. The object detector 128 may correspond to hardware components of the vehicle 102, software (e.g., instructions) executable by the processor 108, or a combination thereof.

During operation, the location sensor 106 may provide location data 116 to the processor 108. In some implementations, the location data 116 may include radar data, lidar data, GPS data, etc. associated with one or more objects, such as an illustrative object 112. The object 112 may be stationary or may be in motion. For example, the object 112 may correspond to a pedestrian, another vehicle, a traffic signal, a roadway obstacle (e.g., a fallen traffic signal, a tree limb, or debris), livestock (e.g., cattle, bison, horses, sheep, or goats), game (e.g., elk, moose, bear, or deer), or a roadside object (e.g., a sign, an advertising billboard, or a road side unit (RSU)), as illustrative non-limiting examples. The object 112 may be proximate to the vehicle 102 or disposed at a significant distance from the vehicle (e.g., not proximate to the vehicle). For example, the object 112 may be within a particular range of the vehicle 102, within a field or direction of travel of the vehicle 102, within a field of view of the image sensor 104, etc. In some implementations, the location sensor 106 includes one or more sensors configured to scan the field of travel of the vehicle 102 for objects, such as the object 112. For example, the location sensor 106 may include a radar device, an ultrasound device, and/or a lidar device configured to generate the location data 116 using signals reflected from the object 112. In some implementations, the location sensor 106 is configured to receive location data associated with one or more objects. For example, the location sensor 106 may include dedicated short-range communication device, an RFID device, a personal network device, or another communication device.

The image sensor 104 may generate image data 114 (e.g., by capturing one or more images) of a scene that includes the object 112. The image sensor 104 may provide the image data 114 to the processor 108. In some implementations, the image sensor 104 may generate the image data 114 in response to a command from the location sensor 106. In a particular illustrative example, if the location sensor 106 detects the object 112 (e.g., using a radar, ultrasound, or lidar technique, or by receiving GPS and/or DSRC information from another device), the location sensor 106 may assert a control signal at a bus that connects the image sensor 104 and the location sensor 106. Alternatively, or in addition, operation of the image sensor 104 may be controlled by the processor 108. For example, the processor 108 may cause the image sensor 104 to generate the image data 114 in response to receiving the location data 116 from the location sensor 106. In other cases, the image sensor 104 may operate independently of the location sensor 106. For example, the image sensor 104 may constantly, periodically, or occasionally capture images and may load image data of the images (e.g., the image data 114) to a buffer, cache, or other memory (e.g., the memory 110). In this example, in response to receiving the location data 116 from the location sensor 106, the processor 108 may retrieve the image data 114 from the buffer, cache, or other memory. To illustrate, the memory 110, or a portion thereof, may function as a circular buffer that is configured to store image data received from the image sensor 104.

The image data 114 may be associated with multiple scale space representations of the scene, such as a first scale space representation 120, a second scale space representation 122, and a third scale space representation 124, for example. Each of the scale space representations 120, 122, and 124 may be associated with a respective image resolution. For example, the first scale space representation 120 may be associated with a first image resolution, the second scale space representation 122 may be associated with a second image resolution that is less than the first image resolution, and the third scale space representation 124 may be associated with a third image resolution that is less than the second image resolution. In the example of FIG. 1, the first scale space representation 120 may correspond to the scene projected onto a "high," "full," and/or "complete" resolution image plane represented in the field of view of the image sensor 104 by a line segment 111. The second scale space representation 122 may correspond to the scene projected onto a "medium" resolution image plane represented by a line segment 113 and the third scale space representation 124 may correspond to the scene projected onto a "low" resolution image plane represented by line segment 115. Thus, as shown in FIG. 1, the line segments 111, 113, and 115 (and the corresponding respective "high," "medium," and "low" resolution image planes) are different distances from the image sensor 104.

Although FIG. 1 illustrates three scale space representations, it should be appreciated that the disclosure is also applicable to different numbers of scale space representations (e.g., two scale space representations, four scale space representations, or another number of scale space representations). In an illustrative example, the first scale space representation 120 corresponds to the image data 114 at a full or complete resolution of the image sensor 104, the second scale space representation 122 corresponds to the image data 114 downsampled by a first factor (e.g., 2), and the third scale space representation 124 corresponds to the image data 114 downsampled by a second factor (e.g., 5) that is larger than the first factor. The processor 108 may be configured to downsample a higher resolution scale space representation to generate one or more lower resolution scale space representations using filtering, decimation, subsampling, interpolation, and/or other image processing techniques. For example, the processor 108 may downsample the first scale space representation 120 to generate the second scale space representation 122 and may downsample the second scale space representation 122 to generate the third scale space representation 124. In another illustrative implementation, the vehicle 102 includes multiple image sensors, where each image sensor generates a different resolution image or scale space representation of a scene.

The object detector 128 may be responsive to the location data 116 and one or more of the scale space representations 120-124. For example, the object detector 128 may select a scale space representation based on the location data 116 and may perform object detection on the selected scale space representation to detect the object 112. To illustrate, the object detector 128 may use the location data 116 to determine an estimated region 118 in which the object 112 is located. The estimated region 118 may correspond to probable location(s) of the object 112 in view of a margin of error associated with the location data 116 (e.g., due to noise, sensor delay, speed/direction of motion of the object 112 and/or the vehicle 102, etc.). The object detector 128 may determine whether any of the image planes corresponding to the scale space representations 120-124 overlaps or intersects the estimated region 118. In the example of FIG. 1, the first scale space representation 120 (corresponding to the line segment 111) and the third scale space representation 124 (corresponding to the line segment 115) do not overlap the estimated region 118. In response to detecting the lack of overlap, the object detector 128 may skip performing object detection on the first scale space representation 120 and the third scale space representation 124 (e.g., to more quickly perform object detection and/or save computational resources).

In the example of FIG. 1, the object detector 128 may determine that the second scale space representation 122 (corresponding to the line segment 113) overlaps the estimated region 118. For example, the object detector 128 may determine that the second scale space representation 122 overlaps the estimated region 118 based on the distance of the resolution image plane of the second scale space 122 and the received location data 116. In response, the object detector 128 may further process the second scale space representation 122. For example, the object detector 128 may identify a search area within the second scale space representation 122, where the search area corresponds to an overlap, intersection, or convergence between a set of locations or area associated with the scale space representation 122 and a set of locations or area associated with the location data 116. To illustrate, FIG. 1 shows a top-down view in which the image sensor 104 has a horizontal field of view bound by field of view lines 117 and 119. Thus, the horizontal boundaries of the second scale space representation 122 are denoted in FIG. 1 by points L0 and L1, and the overlap between the estimated region 118 and the second scale space representation 122 is represented by a line segment between points C0 and C1 (which may alternatively be denoted as "line segment C0C1"). The object detector 128 may perform computer vision operations (e.g., image segmenting operations) in the search area between C0 and C1, instead of in the larger area between L0 and L1, to "pinpoint" the location of the object 112. For example, the object detector 128 may determine a pedestrian location or recognize the object 112 (e.g., to recognize text on a sign). Searching the area between C0 and C1 may include searching parts of the image that extend beyond C0 and C1. For example, C0 and C1 may define center points that are used by different object detection search windows. If a search window to be used by the object detector 128 to identify the object 112 has a width of W, the search area "between" C0 and C1 may range from C0-0.5 W (when the search window is centered on C0) to C1+0.5 W (when the search window is centered on C1). A search area may similarly extend in other dimensions (e.g., in the vertical dimension beyond a height of a search window). The search window may correspond to an object model, bounding box, etc. Thus, although a search area may be described herein in terms of a line segment or set of points, it is to be understood that the actual area of the image being searched may extend beyond the line segment or set of points.

Although FIG. 1 illustrates a two-dimensional (2D) view, the object detection operations described herein can be applied in three-dimensional (3D) scenarios. To illustrate, the points C0, C1, L0, and L1 may all be in 3D space and may have (x, y, z) coordinates. In FIG. 1, object detection and reduction is performed horizontally, along the x-axis in the x-y plane. Alternatively, or in addition (e.g., in parallel with the horizontal operations), object detection and reduction may be performed vertically, along the z-axis in the x-z plane, by selecting an appropriate vertical scale space representation. It will be appreciated that by performing operations in both horizontal and vertical scale spaces, the location of the object 112 may be more accurately determined than when only one direction is used.

In other examples, the object detector 128 may determine that multiple scale space representations overlap the estimated region 118 associated with the location data 116. To illustrate, in FIG. 1, if the third scale space representation 124 corresponds to a line segment 115' instead of the line segment 115, then the object detector 128 would determine that both the second scale space representation 122 and the third scale space representation 124 overlap the estimated region 118. In such a scenario, the object detector 128 may select which of the overlapping scale space representations to perform object detection on. To illustrate, a smaller (e.g., lower resolution) scale space representation may be preferable for object detection in some circumstances, such as when a pedestrian is very close and appears to be very tall due to scale. In this situation, the lower resolution scale space representation may be searched instead of a higher resolution scale space representation. Alternatively, if the higher resolution scale space representation was searched and the object was not found (e.g., because the pedestrian was "too tall" due to scale), the lower resolution scale space representation may also be searched. As another example, when the object being detected is relatively small or has an intricate shape, a larger (e.g., higher resolution) scale space representation may be preferred.

An example process performed by the object detector 128 is described for illustration purposes with reference to FIGS. 2A, 2B, 2C and 2D. The process may include assigning the image sensor 104 a particular location, such as the point (x0, y0) in a coordinate space. The measured or reported position of the object 112 may be assigned a position (x1, y1), which may be at the center of the estimated region 118. It is to be understood that the image sensor 104 and the center of the estimated region 118 may have coordinates (x0, y0, z0) and (x1, y1, z1), respectively, in 3D space, though only the x and y coordinates are described for ease of explanation.

The line segment L0L1 may be associated with a particular distance (d) from the image sensor 104 (e.g., based on camera geometry, resolution, and search area size). Based on the value of d and the position (x0, y0) of the image sensor 104, the line segment L0L1 may be mapped, fitted, or transposed to a location that shares the same coordinate system as the points (x0, y0) and (x1, y1). The points of intersection between the field of view lines 117, 119 and the estimated region 118 (i.e., the points C0 and C1) may be determined. To enable calculation of distances between locations in image data, the image data may be "fused" with the coordinate system of the location data. In some embodiments, a projection of the 3D world space of the image data may be performed offline based on a known location of a device (e.g., vehicle, mobile device, etc.), a field of view, and a pose of the image sensor 104. The projection may then be fused with the location data to identify points to be scanned during object detection.

It is appreciated that at the distance d from the image sensor 104, the position of the object 112 (e.g., the pedestrian) will be between C0 and C1. A line segment I0I1 may represent center points for a search area for the object 112, and may be defined as the intersection of the line segment L0L1 and the line segment C0C1. It is noted that in the example of FIG. 2A, I0=C0 and I1=C1, and therefore the line segment I0I1 is identical to the line segment C0C1. However, when an estimated region for an object is not entirely located within a field of view of the image sensor, I0 may not be equal to C0 and/or I1 may not be equal to C1. For example, in FIG. 2C, I0=L0 and I1=C1.

Figure 2A:
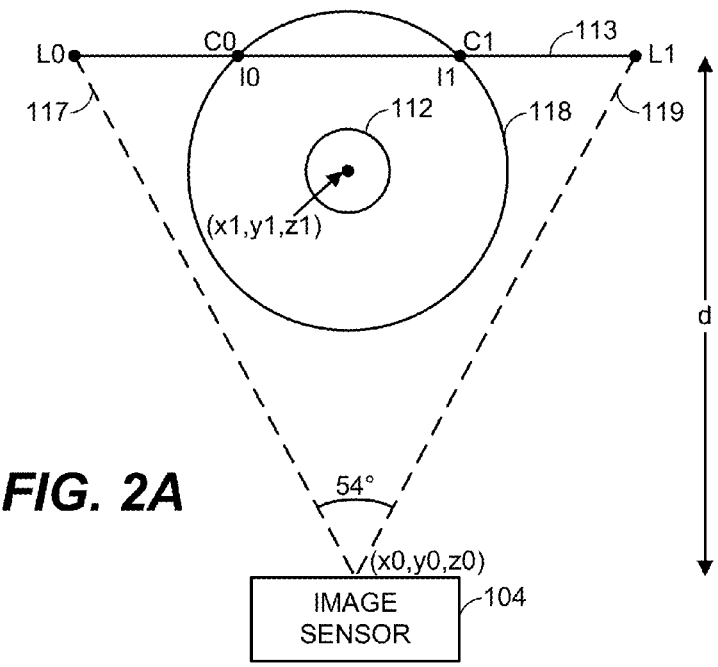

The object detector 128 may perform a linear mapping to map I0 and I1 to image coordinates. In the example of FIG. 2A, L0 corresponds to the left border of the image (having an x-coordinate of 0, i.e., x==0) and L1 corresponds to a right side of the image (having an x-coordinate equal to a width of the image, i.e., x==image_width). Thus, a mapping function M may be defined as:

$$M(I0) = \frac{\text{distance}(L0, I0)}{\text{distance}(L0, L1)} \times \text{image\_width} \quad \text{(Equation 1)}$$

$$M(I1) = \frac{\text{distance}(L0, I1)}{\text{distance}(L0, L1)} \times \text{image\_width} \quad \text{(Equation 2)}$$

Figure 2B:
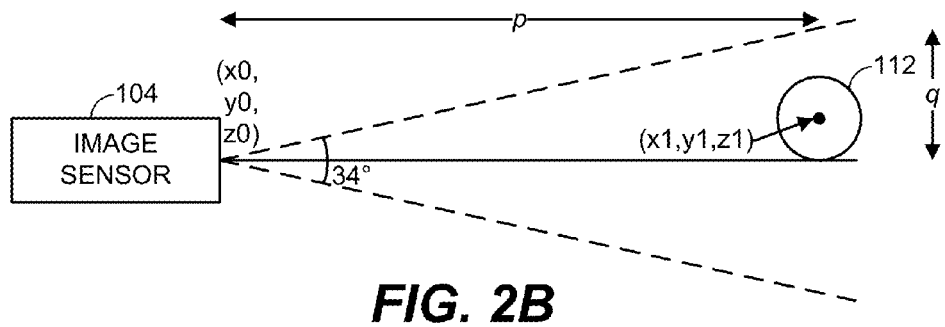

The search area for the object may be restricted to locations (e.g., centers of search windows) in the image having x-coordinates between x==M(I0) and x==M(I1). To illustrate, assume that a horizontal field of view of the image sensor 104 is 54°, as shown in FIG. 2A, and that a vertical field of view of the image sensor 104 is 34°, as shown in FIG. 2B. It is to be understood that the horizontal and vertical fields of view may be larger or smaller in alternative embodiments. It is also assumed that the line segment L0L1 corresponds to 1080p resolution (1920×1080 pixels), and the height of an average pedestrian is assumed to be six feet (about 2 meters), which corresponds to a search area that is 80 pixels in height. It is further assumed that the distance from the image sensor 104 being searched is p feet and an upper half of the image corresponds to q feet at that distance, as shown in FIG. 2B. In view of the foregoing assumptions the following can be established:

$$\tan\left(\frac{34°}{2}\right) = \frac{q}{p} \quad \text{(Equation 3)}$$

$$\frac{q}{1080/2} = \frac{6}{80} \quad \text{(Equation 4)}$$

Solving Equations 3 and 4 for p:

$$p = \frac{q}{\tan(17°)} = \frac{\frac{6 \times 540}{80}}{\tan(17°)} = 132 \text{ feet}$$

If the image sensor 104 is assumed to be (0,0), the reported location of the pedestrian (i.e., center of the circle corresponding to the object 112) is (x1,y1)==(−5,120), and the possible error of the reported location is within 30 feet (i.e., the radius of the estimated region 118 is 30):

$$((x-(-5)) \times (x-(-5))) + ((y-120) \times (y-120)) = 30 \times 30 \quad \text{(Equation 5)}$$

$$L0 \text{ is at the point}\left(-\tan\left(\frac{54°}{2}\right) \times 132, 132\right)$$

$$L1 \text{ is at the point}\left(\tan\left(\frac{54°}{2}\right) \times 132, 132\right)$$

Because L0, L1, C0, and C1 are collinear, all four points have the same y-coordinate, i.e., 132 in the current example. Substituting y==132 into Equation 5 results in the solutions (x+5)=27.5 and (x+5)=−27.5. Thus, C0 is located at the point (−32.5, 132) and C1 is located at the point (22.5, 132). Using the previously defined mapping M:

$$M(C0_x) = \frac{-32.5 + \tan(27) \times 132}{2 \times \tan(27) \times 132} \times 1920 = 496$$

$$M(C1_x) = \frac{22.5 + \tan(27) \times 132}{2 \times \tan(27) \times 132} \times 1920 = 1281$$

Thus, for the object 112, the search area can bound to the left by x==496 and to the right by x==1281, which provides approximately a 60% savings compared to searching from x==0 to x==1920. Moreover, it is to be understood that although the foregoing example illustrates calculations and savings in the horizontal direction, computational savings may also be achieved by similarly restricting the search area in the vertical direction based on the location data 116.

Figure 2C:
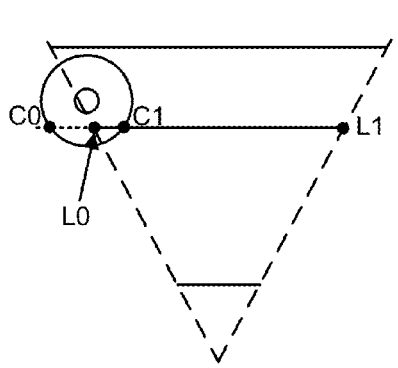
Figure 2D:
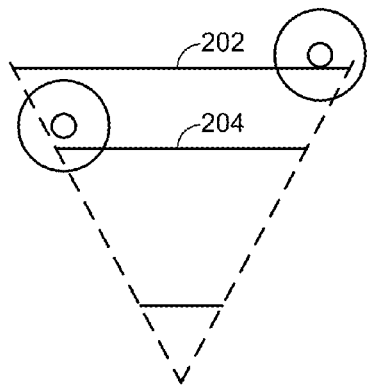

FIGS. 2C and 2D illustrate additional examples of operation. In the example of FIG. 2C, the estimated region of the object partially intersects the field of view of the image sensor. In the example of FIG. 2D, two object detection operations are performed: a first object detection operation is performed on a first scale space representation (corresponding to line segment 202) to detect the object on the right, and a second object detection operation is performed on a second scale space representation (corresponding to line segment 204) to detect the object on the left.

FIGS. 1-2 thus illustrate embodiments of a system that is configured to refine object detection operations, which are to be performed on image data or scale space representation(s) generated therefrom, based on location data associated with an object to be detected. For example, the location data may be used to narrow a search area for the object to less than the entire scene, which may enable the object to be detected faster. To illustrate, a pedestrian may be detected quickly enough for a vehicle (or a driver of the vehicle) to react to the pedestrian, such as, by slowing the vehicle, redirecting the vehicle, and/or speeding up the vehicle while redirecting the vehicle away from the pedestrian if, for example, applying brakes in icy weather would result in the vehicle skidding into the pedestrian. As another illustrative example, the object detection may be performed quickly enough for an ADAS of the vehicle to change a speed of the vehicle and/or redirect the vehicle to avoid colliding with a moving or stationary object.

Figure 3:
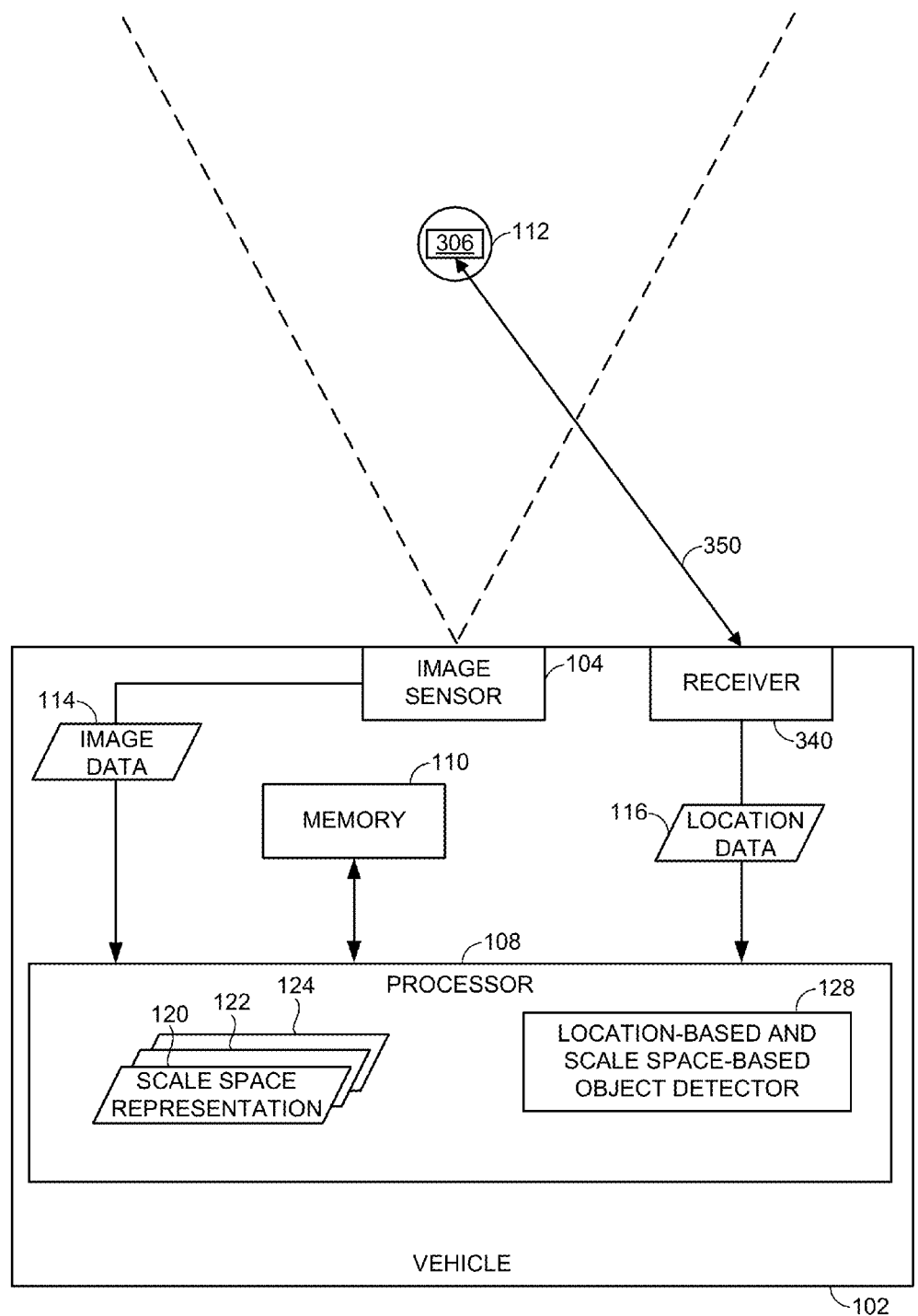
FIG. 3 is a diagram that depicts another illustrative example of a system that is operable to perform object detection using location data and scale space representations of image data.

FIG. 3 illustrates an alternative embodiment of the vehicle 102. FIG. 3 differs from FIG. 1 in that a location sensor that generates the location data 116 is external to the vehicle 102. For example, in FIG. 3, the object 112 includes or is associated with a location sensor 306. In some implementations, the location sensor 306 may be worn by a pedestrian, attached or coupled to another vehicle, or integrated within another vehicle. As discussed above, in some implementations the location sensor 306 may be separate from the object 112 and the vehicle 102. For example, the location sensor 306 can be fixed to a roadside unit (RSU), fixed to a street sign, or fixed or associated with another vehicle that is separate from the vehicle 102. In some examples, a stationary roadside sensor may communicate with a RSU and/or a vehicle. Thus, although FIG. 3 illustrates direct communication between the location sensor 306 and the vehicle 102, data from the location sensor 306 may alternatively be transmitted through one or more intermediary devices before reaching the vehicle 102. To illustrate, data from a location sensor carried by a pedestrian may travel from the location sensor to an RSU to a first vehicle (e.g., that is closest to the pedestrian) to a second vehicle (e.g., that is trailing the first vehicle).

The vehicle 102 may include a receiver 340 configured to receive the location data 116 via a connection 350, such as a wireless network connection. In illustrative examples, the location sensor 306 and the receiver 340 communicate via a cellular connection, a wide area network, an Institute of Electrical and Electronics Engineers (IEEE) 802.11 connection, an ad-hoc network connection, a dedicated short-range communication (DSRC) network connection, or another type of connection.

In an illustrative example, the location data 116 received from the location sensor 306 includes location coordinates, for example, GPS coordinates. When the object 112 is another vehicle (e.g., the location sensor 306 is part of a device within or coupled to the other vehicle), the location data 116 may be received from the other vehicle (e.g., via a DRSC network) using vehicle-to-vehicle (V2V) communication. As another example, a roadside unit (RSU) may transmit traffic information to vehicles. To illustrate, the object 112 may include a vehicle involved in an accident within the field of travel of the vehicle 102, and the location data 116 may include location coordinates of the vehicle involved in the accident. In this case, the receiver 340 may receive the location data 116 from the RSU using vehicle-to-infrastructure (V2I) communication. It should be understood that in other examples location data can be received from multiple sources. For example, location data associated with a common object could be received from more than one vehicle, RSU, or location sensor. When multiple sources of location data are used, the sources (and/or data therefrom) can be aggregated, prioritized, or used to refine one another. For example, the estimated region 118 of FIGS. 1-2 may encompass all of the location data provided by the multiple sources, may correspond to location data from a most reliable source, may be based on an intersection of the location data from each (or a subset) of the multiple sources, or may otherwise be determined based on the location data from some or all of the multiple sources.

It should be noted that although the foregoing embodiments describe refining object detection in image data based on location data, the present disclosure is not so limited. In accordance with the present disclosure, data from a first sensor may be used to refine operation of a second sensor. As an illustrative non-limiting example, a property of an image sensor (e.g., resolution, capture frequency, area of interest, field of view (in the case of a movable camera), etc.) may be adjusted based on location data. As another example, image data may be used to speed up location determination by a location sensor, such as by determining a "coarse" location of the object based on the image data. Thus, the present disclosure enables different types of sensors to communicate with each other to refine their respective operations.

In a particular embodiment, the processor 108 may perform an object detection operation using location data from a three-dimensional (3D) map application 130. To illustrate, the 3D map application 130 may indicate or provide a portion or area of a 3D map that can be accessed by the object detector 128 to narrow a search area based on a "known" object class (e.g., pedestrian, vehicle, traffic sign, etc.) being searched. Although FIG. 1 illustrates the location data 116 as being determined by the location sensor 106, in alternative embodiments the location data 116 may be determined based on the 3D map application 130 instead of or in addition to the location sensor 106 (or an external location sensor, such as the location sensor 306 of FIG. 3). The object detection techniques described herein may thus be used in conjunction with embodiments where 3D map data is used during object detection, a location sensor is used during object detection, or both 3D map data and a location sensor are used during object detection.

Figure 4:
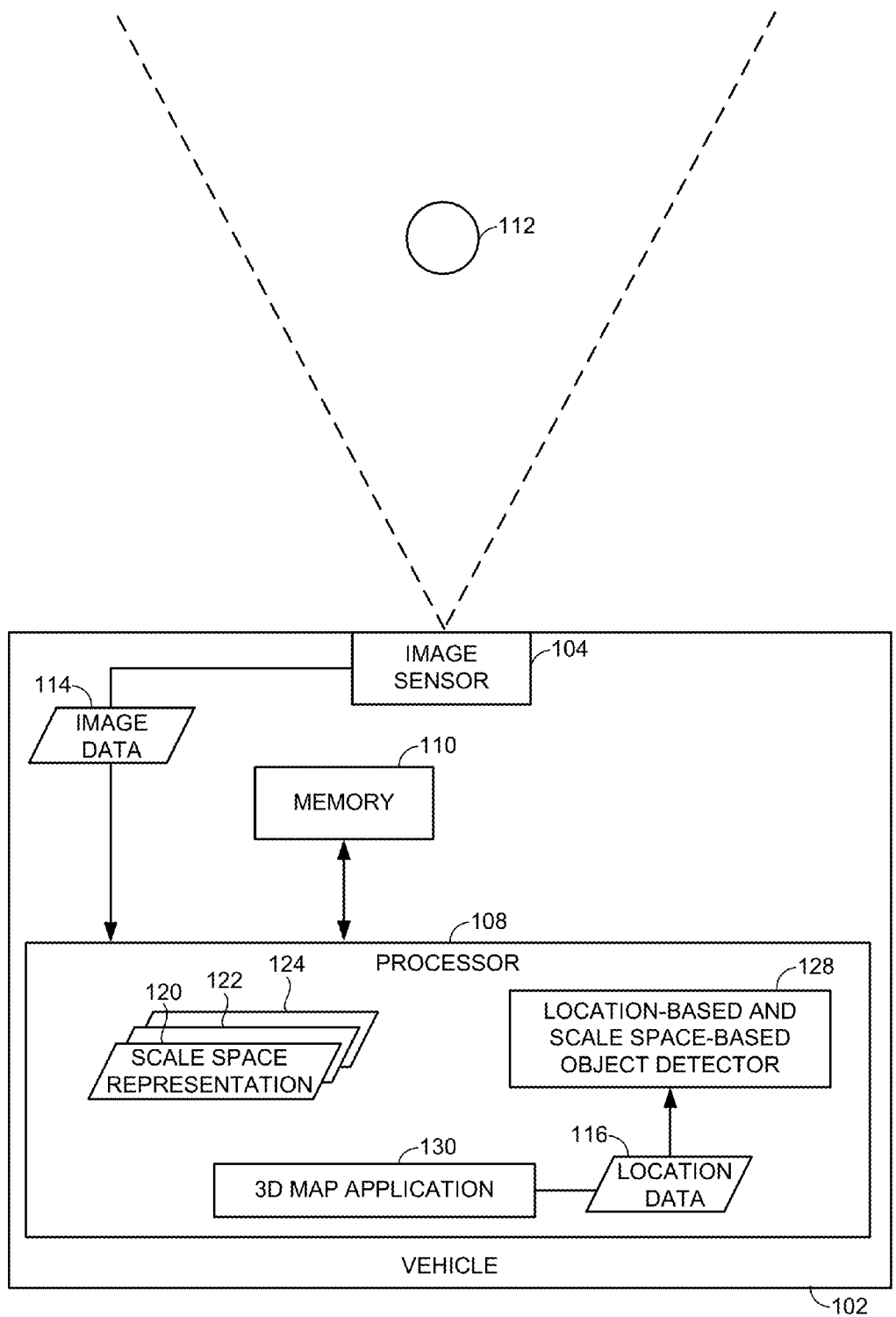
FIG. 4 is a diagram that depicts another illustrative example of a system that is operable to perform object detection using location data and scale space representations of image data.

FIG. 4 illustrates an example of a system in which the object detector 128 receives location data 116 from the 3D map application 130 and does not receive any additional location data from a location sensor. The location data 116 provided by the 3D map application 130 may be indicative of where an object class may be present within the image data 114. For example, the system shown in FIG. 4 may enable a vehicle to perform detection for pedestrians, tree limbs, other vehicles, etc., based on location data 116 received from the 3D map application 130 and indicative of where these objects may be present in the image data 114.

For example, if the object detector 128 is configured to detect a pedestrian within a scale space representation of a scene, the 3D map application 130 may indicate one or more areas of the scene where a pedestrian could possibly be present (e.g., from 0 meters to 3 meters above a road or ground surface), and the object detector 128 may initiate a search of the indicated area(s) without receiving data from a separate location sensor. In another example, the 3D map application 130 may indicate one or more areas of the scene that correspond to a road surface, such that the object detector 128 can efficiently detect objects that are on the road. In some implementations, the object class may be determined by the processor 108 based on the image data 114 and/or the location data 116. Alternatively, the object class may be indicated by the object 112 (e.g., transmitted by the object 112 to a receiver as described with reference to FIG. 3).

During operation, a 3D map may be dynamically generated at the vehicle 102, downloaded or pre-downloaded to the vehicle 102, etc. After determining a location of the road surface and receiving the location data 116, the object detector 128 may focus the search area to the road surface based on the 3D map (e.g., non-road surface areas may be excluded from the image search area). As an illustrative example, if a portion of the line segment L0L1 of FIG. 1 (or the line segment C0C1 of FIG. 1) corresponds to a non-road surface area, then the object detector 128 may exclude the portion from the search area. Examples of non-road surface areas include regions above or below the road surface and regions left or right of the road surface. It should be understood, however, that when the image sensor 104 is in motion as part of a vehicle or other device, the area(s) of interest may vary from frame to frame based on the location of a vehicle or device relative to the 3D map. For example, when topographical changes occur (e.g., a vehicle approaches an incline or decline in the road), the search area of interest may change. The location data 116 provided by the 3D map application 130 may be dynamic and may change depending on the known location of the vehicle or device.

In some implementations, the object detector 128 is configured to generate a search area mask based on the 3D map indicated by the 3D map application 130. A mask image may be generated either offline or online (based on, for example, a tradeoff between storage and computational burden) using the 3D map. An example process is further described with reference to FIG. 6.

Figure 5:
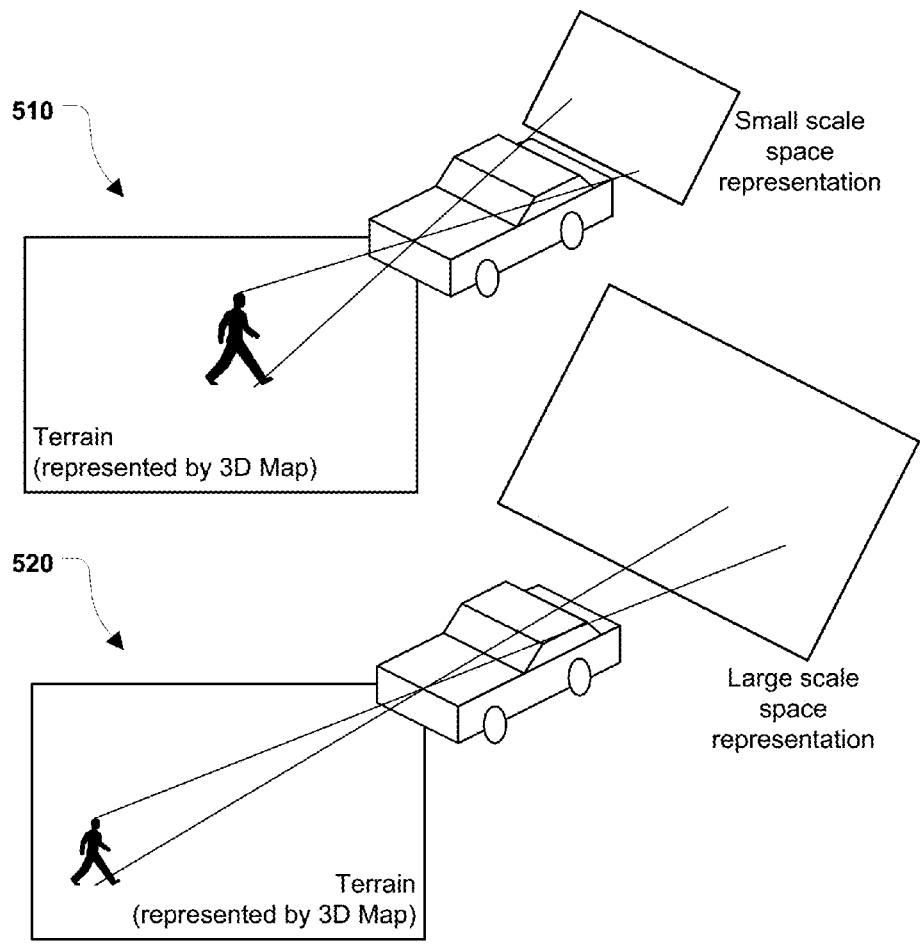
FIG. 5A depicts an illustrative example of using three-dimensional (3D) map data to perform object detection.
FIG. 5B depicts an illustrative example of a mask that may be used during object detection.

FIG. 5A depicts two scenarios in which a pedestrian is within a field of view of a vehicle, where the pedestrian is located on terrain represented by 3D map data available to the vehicle. In the first scenario, at 510, the pedestrian is closer to the vehicle and, as a result, the vehicle uses a smaller scale space representation to perform object detection. In the second scenario, at 520, the pedestrian is further from the vehicle and, as a result, the vehicle uses a larger scale space representation to perform object detection. When multiple scale space representations overlap a possible location of an object some scale space representations may be processed while other scale space representations are excluded from further processing. As an illustrative non-limiting example, a smaller (e.g., lower resolution) scale space representation may be preferable to detect a pedestrian that is close to a vehicle, because the height and/or width of the pedestrian in a larger scale space representation may be too large to detect using a pedestrian object class or model. Prior to performing the object detection, the scale space representation being searched may be masked based on the location data provided by a 3D map application. An illustrative example of a mask is shown in FIG. 5B, at 530. The mask may be generated by marking different regions of the scale space representation with zeros or non-zeros (e.g., "1" or a non-zero fractional value). Areas marked with non-zeros may be searched and areas marked with zeros may be ignored during object detection. When non-zero fractional values are used, a higher non-zero fraction value may represent a greater probability of locating the object in the corresponding area. For example, as shown in FIG. 5B, the area marked with "0.5" may be searched prior to searching the area marked "0.3."

In a particular embodiment, the probabilities for the areas of the mask (e.g., 0.5 and 0.3 in the mask of FIG. 5B) may be generated based on a set of training samples. The set of training samples may contain 3D position(s) of place(s) where a pedestrian can appear. The set of training samples may also include positions that have been marked as "dangerous" by an expert. For example, such "dangerous" positions may be positions in which pedestrians have a higher likelihood of being obscured, being difficult for a driver to notice, being involved in an accident, etc. In some embodiments, the 3D positions of the set of training samples may be associated with probabilities. While generating the mask image, the 3D positions may be projected onto an image plane, and different portions of the mask may be assigned different probabilities based on the 3D positions corresponding to underlying pixels of the image plane.

In a particular embodiment, a probabilistic model and mask can be used with respect to sensor data instead of or in addition to 3D map data. For example, the estimated region 118 of FIGS. 1-2 may correspond to a mask, where different sub-regions have different probability values between zero and one. The probability values may be based on location data from a location sensor (e.g., the location sensor 106), location data from a 3D map application (e.g., the 3D map application 130), 3D map data, a sensor or application margin of error, sensor calibration, and/or sensor sensitivity, as illustrative non-limiting examples.

Thus, the processor 108 may determine a search area or areas based on 3D map data and the object class of the object. The object detector may perform object detection in the search area, as described with reference to FIG. 1. It is noted that when using 3D map data to perform object detection, projection may be performed in view of possible inaccuracy of localization result(s). That is, a range of camera locations may be enumerated due to localization inaccuracy. It should also be noted that in particular embodiments, masks/search areas may be constructed offline and used (e.g., to skip searching of masked off areas) in a real-time (or near-real-time) stream received from a camera (e.g., the image sensor 104). Moreover, instead of dynamically constructing a 3D map, 3D conditions may be approximated with a plane/surface estimator, which may provide a rough real-time (or near-real-time) plane. For example, in an area where most roads are on planar surfaces, the 3D map may be estimated by using a plane with some slope variation to estimate the projected masks. In a particular embodiment, the foregoing method can also be used to find an object of interest in a particular area. For example, the object detector 128 may find pedestrians (or other objects) in an area that include or are close to a "current" driving lane of the vehicle 102 but may ignore pedestrians in sidewalk areas. As another example, the object detector 128 may be part of an object tracking framework in which tracking areas are limited based on masks.

Although FIGS. 1-3 describe performing object detection using location data from a location sensor and FIG. 4 illustrates performing object detection using location data provided by a 3D map application instead of a location sensor, it should be noted that the aforementioned embodiments are not mutually exclusive. In some examples, 3D map data can be used along with data from a location sensor, and may enable faster object detection and further reduction of scan area(s).

Figure 6:
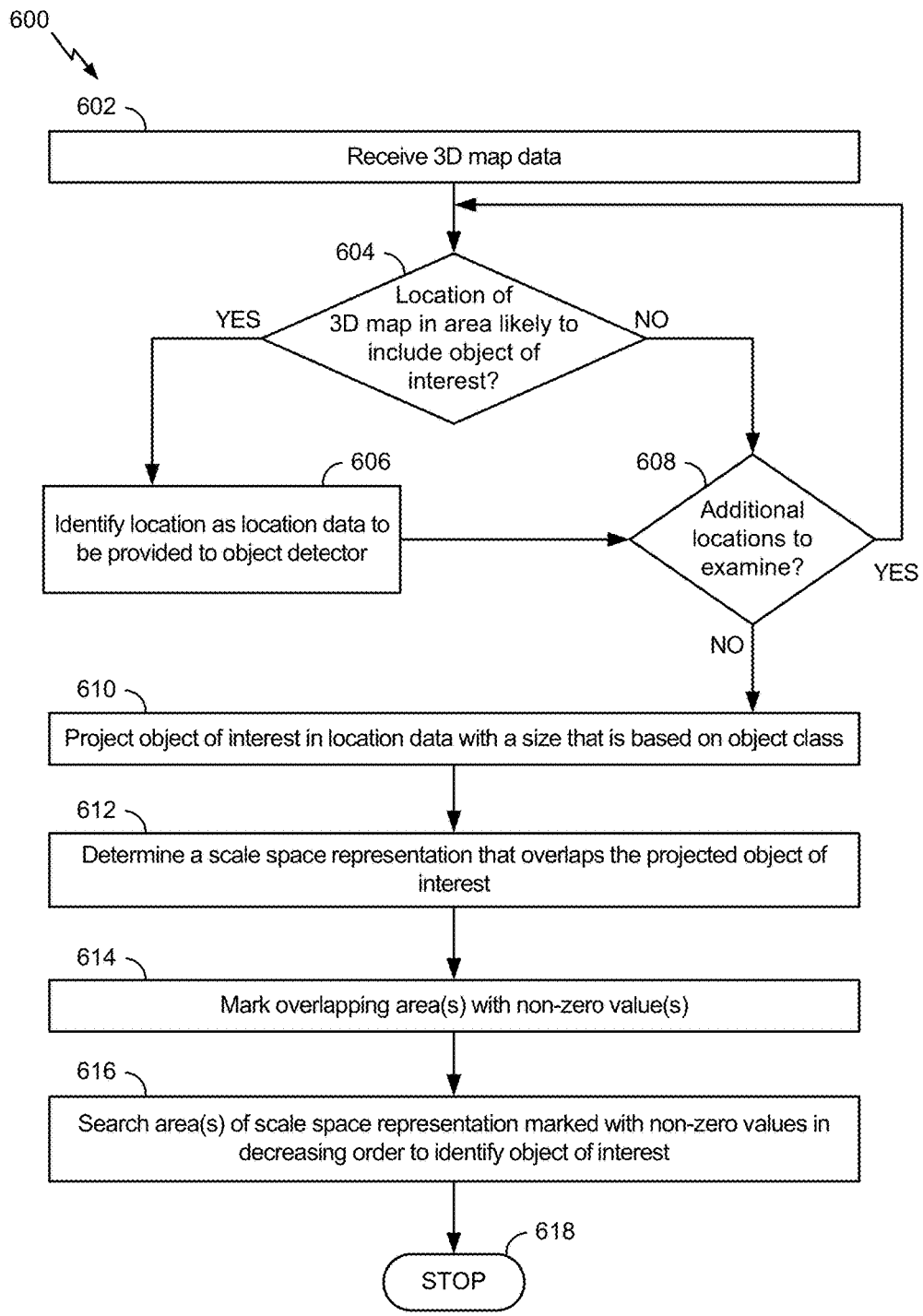
FIG. 6 is a flowchart that illustrates an illustrative example of a method of identifying area(s) of interest based on 3D map data.

Referring to FIG. 6, a particular embodiment of a method of identifying area(s) of interest based on 3D map data is shown and generally designated 600. The method 600 includes receiving 3D map data, at block 602. For example, the 3D map application 130 may receive 3D map data, such as from an external data source, a local storage device, etc. The method 600 also includes determining whether a location of the 3D map is likely to include an object of interest, at block 604. If so, the method 600 includes identifying the location as location data to be provided to an object detector, at block 606. If the location is not likely to include the object of interest, or after identifying the location data, the method 600 includes determining whether additional locations are to be examined, at block 608. If so, the method 600 returns to block 604. To illustrate, referring to FIGS. 4-5, the location data 116 may indicate one or more areas of the terrain that are likely to include a pedestrian, such as the pedestrian that is close to the vehicle, at 510, or the pedestrian that is far from the vehicle, at 520.

Continuing to block 610, the method 600 includes projecting the object of interest in the location data with a size that is based on an object class of the object of interest. In the example of FIG. 5A, a pedestrian may be projected in the identified location data corresponding to the roadway being traveled by the vehicle. The method 600 further includes determining a scale space representation that overlaps the projected object of interest, at block 612, and marking the overlapping area(s) of the scale space representation with non-zero value(s), at block 614. To illustrate, for the pedestrian closer to the vehicle in FIG. 5A at 510, areas in the small scale space representation may be masked with non-zero values. For the pedestrian farther from the vehicle in FIG. 5A at 520, areas in the large scale space representation may be masked with non-zero values. In an illustrative example, the scale space representation may be masked as shown in FIG. 5B at 530.

In an example, 3D map data may be used to alter an orientation or field of view of an image sensor, and/or the 3D map data may be used to select a portion of image data that is generated by multiple image sensors. As another example, when a vehicle turns left or right, the image sensor of the vehicle may automatically be actuated left or right so that the image sensor continues to capture image data that is "ahead of" the vehicle. As another example, an image sensor of a vehicle may be actuated automatically to "look" left and right to identify pedestrians, other approaching vehicles, road hazards, etc. To illustrate, a 360° stitched view of a vehicle's surroundings may be generated and a driver of the vehicle may be notified ahead of time if there is a pedestrian crossing a street that the driver may later turn on. In a particular embodiment, when the driver is using turn-by-turn navigation directions (e.g., provided by a navigation application of the vehicle or a mobile device within the vehicle), the navigation directions may be used to anticipate turns that will be made by the vehicle, lane changes that will be made, etc., such as to prioritize search areas, determine probability values for search masks, etc.

The method 600 includes searching area(s) of the scale space representation marked with non-zero values in decreasing order to identify the object of interest, at block 616. For example, referring to the mask shown in FIG. 5B, the areas marked "0.5" may be searched prior to searching the areas marked "0.3." The method 600 ends at block 618.

The method 600 of FIG. 6 thus illustrates an example of performing object detection on one or more scale space representations based on 3D map data. The 3D map data may be used in lieu of, or in addition to, location data provided by a location sensor.

Figure 7:
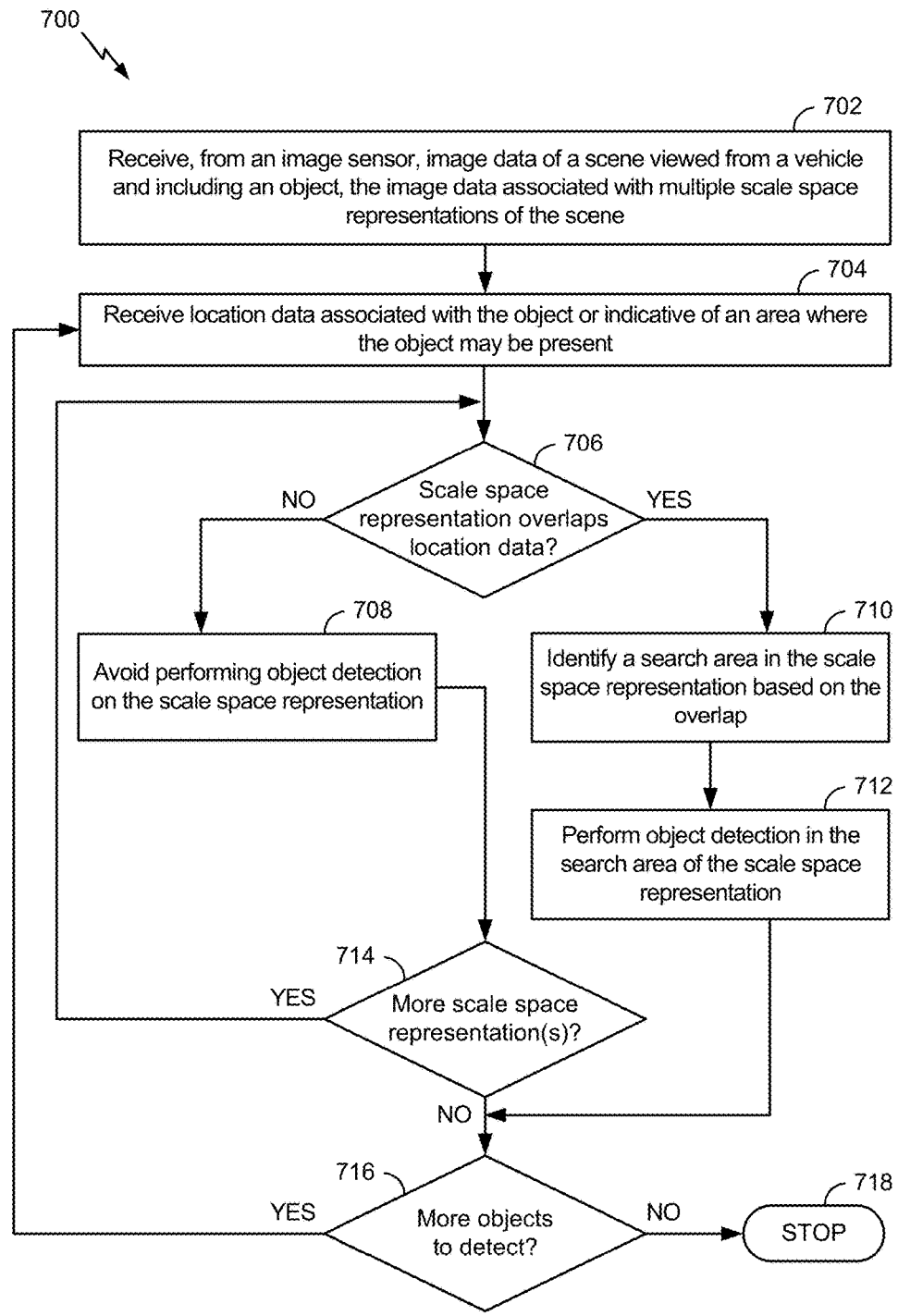
FIG. 7 is a flowchart that depicts an illustrative example of a method of object detection using location data and scale space representations of image data.

Referring to FIG. 7, an illustrative method of object detection is shown and generally designated 700. The method 700 includes receiving, from an image sensor, image data of a scene that includes an object, at block 702. The image data is associated with multiple scale space representations of the scene. For example, the processor 108 may receive the image data 114 from the image sensor 104, where the image data 114 is associated with (e.g., can be used to generate) the scale space representations 120-124.

The method 700 also includes receiving location data associated with the object or indicative of an area where the object may be present, at block 704. For example, the processor 108 may receive the location data 116 from the on-board location sensor 106 in the vehicle 102, as described with reference to FIG. 1. As another example, the processor 108 may receive the location data 116 from the location sensor 306, which is external to the vehicle 102, via the receiver 340, as described with reference to FIG. 3. In another example, the object detector 128 may receive location data 116 from a 3D map application 130 with the location data being indicative of an area where an object may be present (e.g., on a road, in a lane, etc.), as described with reference to FIG. 4. In yet another example, location data may be received from multiple sources, such as from multiple location sensors, a location sensor and a 3D map application, etc.

The method 700 further includes determining whether a first scale space representation overlaps the location data, at block 706. When the first scale space representation overlaps the location data, a search area in the first scale space representation is identified, at block 710. Advancing to block 712, object detection is performed in the search area. To illustrate, in the example of FIG. 1, the object detector 128 may determine that the scale space representation 122 overlaps the estimated region 118 corresponding to the location data 116. In response, the object detector 128 may determine a search area of the scale space representation 122, as described with reference to Equations 1-5, and may perform object detection in the search area.

Alternatively, when the first scale space representation does not overlap the location data, the method 700 includes avoiding the performance of object detection on the scale space representation, at block 708. To illustrate, in the example of FIG. 1, the object detector may avoid performing object detection on the scale space representations 120 and 124 due to the lack of overlap between the estimated region 118 and the scale space representations 120 and 124. Continuing to block 714, the method 700 includes determining whether additional scale space representations are to be examined (e.g., when multiple scale space representations overlap the location data). If so, the method 700 returns to block 706. If not, or after the object detection is performed at block 712, the method 700 includes determining whether additional objects are to be detected, at block 716. If so, the method 700 returns to block 704 to process location data for the additional objects. If not, the method 700 ends, at block 718.

When multiple scale space representations are found to overlap location data, object detection may be performed on one, some, or all over the overlapping scale space representations (e.g., until the object of interest is detected). For example, as described with reference to FIG. 5A, a lowest resolution scale space representation may be examined first to detect a pedestrian that is close to a vehicle.

One or more operations of the methods 600 and/or 700 may be initiated, controlled, or performed by a hardware device, such as a processing unit. For example, depending on the particular implementation, the processing unit may include a field-programmable gate array (FPGA) device, an application-specific integrated circuit (ASIC), a processing unit such as a central processing unit (CPU), a digital signal processor (DSP), a controller, another hardware device, a firmware device, or a combination thereof.

Figure 8:
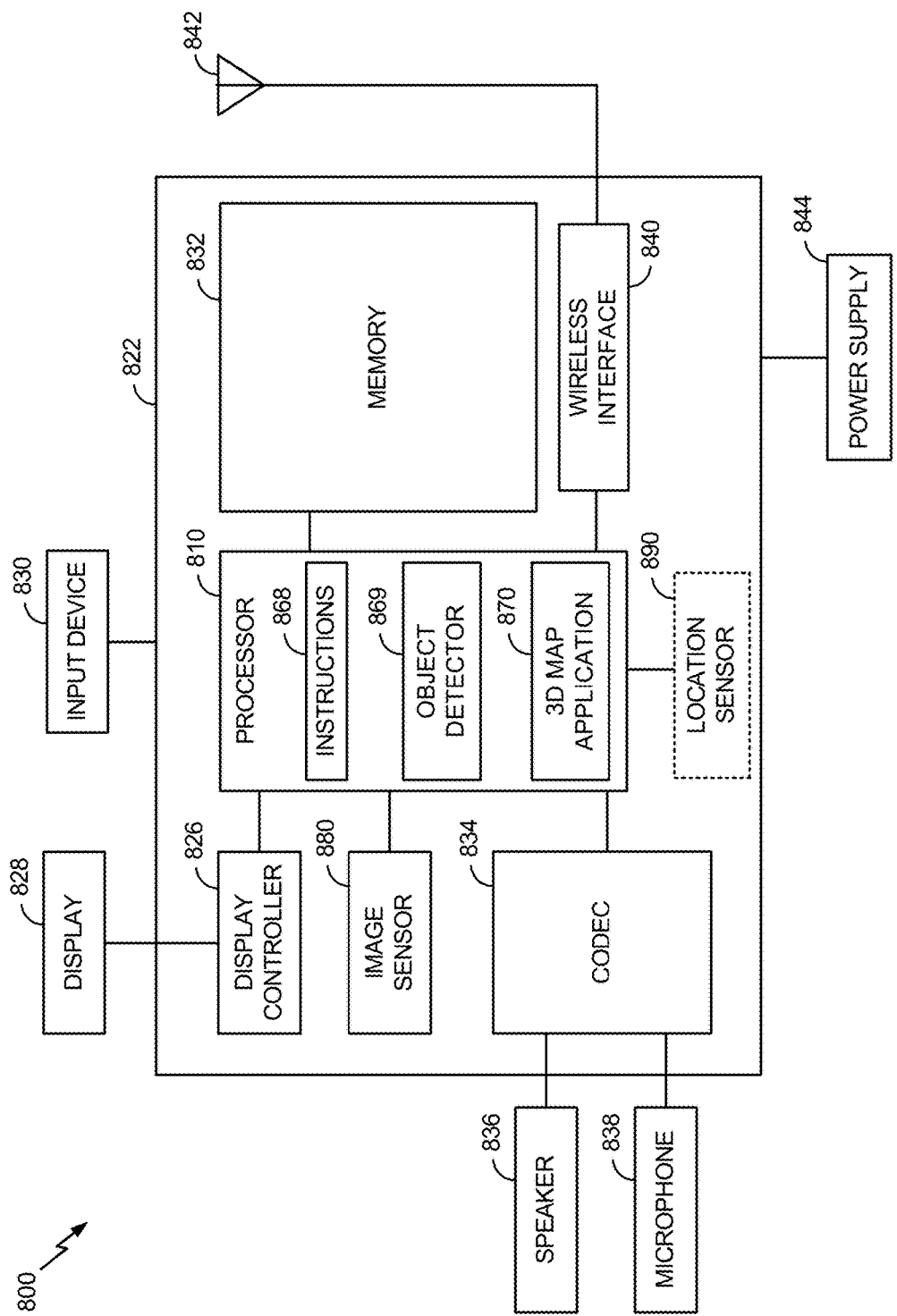
FIG. 8 is a block diagram of an illustrative example of an electronic device.

Referring to FIG. 8, a block diagram of a particular illustrative embodiment of an electronic device is depicted and generally designated 800. In a particular embodiment, the electronic device 800, or components thereof, may be worn by or carried by a pedestrian (e.g., as part of a mobile phone, a tablet computer, a smartwatch, etc.). In another particular embodiment, the electronic device 800, or components thereof, may be included in or may be attached/coupled to a vehicle. In another particular embodiment, the electronic device 800, or components thereof, may be included in or may be attached/coupled to a roadside unit (RSU), a street sign, a traffic light, or another roadside object or device. In further embodiments, the electronic device 800 may correspond to a computer (e.g., a laptop computer, a tablet computer, or a desktop computer), a set top box, an entertainment unit, a navigation device, a personal digital assistant (PDA), a television, a tuner, a radio (e.g., a satellite radio), a music player (e.g., a digital music player and/or a portable music player), a video player (e.g., a digital video player, such as a digital video disc (DVD) player and/or a portable digital video player), another electronic device, or a combination thereof.

The electronic device 800 includes a memory 832 and a processor 810, such as a digital signal processor (DSP), a central processing unit (CPU), and/or a graphics processing unit (GPU), as illustrative examples. The processor 810 may execute instructions 868. In an illustrative example, the instructions 868 are executable by the processor 810 to perform one or more functions or methods described herein, including but not limited to the method 600 of FIG. 6 and/or the method 700 of FIG. 7. The processor 810 may also include hardware corresponding to, and/or execute software instructions corresponding to, an object detector 869 (e.g., the object detector 128 of FIGS. 1, 3, and 4) and a 3D map application 870 (e.g., the 3D map application 130 of FIGS. 1 and 4).

FIG. 8 also shows a display controller 826 that is coupled to the processor 810 and to a display 828. A coder/decoder (CODEC) 834, such as an analog audio processing front-end, can also be coupled to the processor 810. A speaker 836 and a microphone 838 can be coupled to the CODEC 834. FIG. 8 also indicates that a wireless interface 840, such as a wireless controller and/or a transceiver, can be coupled to the processor 810 and to an antenna 842. In particular embodiments, the electronic device 800 may include multiple wireless interfaces and antennas. Each wireless interface and/or antenna may correspond to a different communication technology or network (e.g., cellular, IEEE 802.11, DSRC, etc.).

In a particular embodiment, the processor 810 is further coupled to an image sensor 880 (e.g., the image sensor 104 of FIGS. 1, 3, and 4). The processor 810 may also be coupled to a location sensor 890 (e.g., the location sensor 106 of FIG. 1). Alternatively, the processor 810 may receive location data from an external location sensor via a receiver, such as the wireless interface 840 and/or the antenna 842, and/or the processor 810 may receive location data from the 3D map application 870.

In a particular embodiment, the processor 810, the display controller 826, the CODEC 834, the wireless interface 840, the image sensor 880, and the location sensor 890 (when present) are included in a system-in-package or system-on-chip device 822. Further, an input device 830 and a power supply 844 may be coupled to the system-on-chip device 822. Moreover, in a particular embodiment, as illustrated in FIG. 8, the display 828, the input device 830, the speaker 836, the microphone 838, the antenna 842, and the power supply 844 are external to the system-on-chip device 822. However, each of the display 828, the input device 830, the speaker 836, the microphone 838, the antenna 842, and the power supply 844 can be coupled to a component of the system-on-chip device 822, such as to an interface or to a controller.

In connection with the described embodiments, an apparatus includes means for receiving image data of a scene viewed from the apparatus and including an object, the image data associated with multiple scale space representations of the scene. For example, the means for receiving may include the image sensor 104, the image sensor 880, a processor or controller coupled to an image sensor (e.g., the processor 108 or the processor 810), another device configured to receive image data, or any combination thereof. The apparatus also includes means for processing. The means for processing is configured to identify a search area of a first scale space representation of the multiple scale space representations based on an overlap between the first scale space representation and location data associated with the object or indicative of an area where the object may be present. The means for processing is also configured to perform object detection in the search area of the first scale space representation. For example, the means for processing may include the processor 108, the object detector 128, the processor 810, the object detector 869, the 3D map application 130, the 3D map application 870, another device configured to process data, or any combination thereof. In a particular embodiment, the apparatus includes means for generating the location data. For example, the means for generating the location data may include the location sensor 106, the location sensor 306, the location sensor 890, the 3D map application 130, another device configured to generate location data, or any combination thereof. In a particular embodiment, the apparatus includes means for receiving the location data from an external location sensor. For example, the means for receiving may include the receiver 340, the wireless interface 840, the antenna 842, another device configured to receive data from an external sensor, or any combination thereof.

The foregoing disclosed devices and functionalities may be designed and represented using computer files (e.g. RTL, GDSII, GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The chips are then employed in electronic devices, such as a component of the vehicle 102, the electronic device 800, etc.

Although one or more of FIGS. 1-8 may illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. Accordingly, no single example should be construed as limiting and embodiments of the disclosure may be suitably combined without departing from the teachings of the disclosure.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory computer-readable or processor-readable storage medium or storage device known in the art. An exemplary storage medium or device is coupled to the processor such that the processor can read information from, and write information to, the storage medium. In the alternative, the storage medium or device may be integral to the processor. The processor and the storage medium or device may reside in an application-specific integrated circuit (ASIC). The ASIC may reside in a computing device or a user terminal. In the alternative, the processor and the storage medium or device may reside as discrete components in a computing device or user terminal. A computer-readable or processor-readable storage medium or storage device is not a signal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
    a memory;
    a processor configured to:
        receive location data associated with an object;
        receive image data of a scene from an image sensor, the scene including the object, the image data associated with multiple scale space representations of the scene, the multiple scale space representations including a first scale space representation and a second scale space representation, wherein the first and second scale space representations are associated with different distances in a same direction from an image sensor and different resolution images of the same field of view of the scene;
        identify a search area of a sub-region of one or more of the multiple scale space representations of the scene based on an overlap of a region indicated by the location data and one or more areas associated with one or more of the multiple scale space representations of the scene; and
        detect the object in the search area of the one or more of the multiple scale space representations.

2. The apparatus of claim 1, wherein the search area corresponds to the overlap of a first area associated with the first scale space representation and the region.

3. The apparatus of claim 1, wherein the processor is further configured to generate a mask of the search area, the mask comprising a plurality of regions, and wherein each of the plurality of regions corresponds to one or more pixels associated with the image data and to a value indicative of a probability of detecting the object in the corresponding region.

4. The apparatus of claim 1, wherein the processor is configured to determine whether a first area associated with the second scale space representation overlaps the region.

5. The apparatus of claim 4, wherein the processor is further configured to determine whether a second area associated with the first scale space representation overlaps the region prior to detection of the object.

6. The apparatus of claim 4, wherein the first scale space representation corresponds to a first resolution image of the scene, the second scale space representation corresponds to a second resolution image of the scene, and wherein the second resolution image is a lower resolution image than the first resolution image.

7. The apparatus of claim 1, further comprising a location sensor, wherein the processor is configured to receive the location data from the location sensor.

8. The apparatus of claim 7, wherein the location sensor comprises a radar device, a light detection and ranging (lidar) device, a global positioning system (GPS) device, an ultrasound device, a dedicated short-range communication device, or any combination thereof.

9. The apparatus of claim 1, wherein the processor is configured to receive the location data from a location sensor that is separate from the apparatus.

10. The apparatus of claim 1, wherein the location data corresponds to one or more areas of a three-dimensional (3D) map indicative of where the object may be present, and further comprising a display coupled to the processor and configured to present the 3D map including an indication associated with detection of the object.

11. The apparatus of claim 10, further comprising a processor that includes the processor, wherein the location data is also associated with a location of the object provided by a location sensor.

12. The apparatus of claim 1, further comprising the image sensor, wherein the image sensor comprises a camera.

13. A method of detecting an object, the method comprising:
    receiving from an image sensor, at a processor, image data of a scene including an object, the image data associated with multiple scale space representations of the scene, the multiple scale space representations including a first scale space representation and a second scale space representation, wherein the first and second scale space representations are associated with different distances in a same direction from an image sensor and different resolution images of the same field of view of the scene;
    receiving, at the processor, location data associated with the object;
    identifying, at the processor, a search area of a sub-region of one or more multiple scale space representations of the scene based on an overlaps of a region indicated by the location data and one or more areas associated with the one or more of the multiple scale space representations of the scene; and
    performing, at the processor, object detection in the search area of the one or more of the scale space representations.

14. The method of claim 13, wherein the search area corresponds to the overlap of a first area associated with the first scale space representation and the region.

15. The method of claim 13, further comprising determining whether each of a first area associated with the first scale space representation and a second area associated with the second scale space representation of the multiple scale space representations overlaps the region, wherein the first scale space representation is associated with a first distance from the image sensor in a direction, the second scale space representation is associated with a second distance from the image sensor in the direction, and wherein the first distance is different from the second distance.

16. The method of claim 15, further comprising avoiding performance of object detection on the second scale space representation responsive to determining the second area does not overlap the region.

17. The method of claim 15, further comprising performing object detection on the second scale space representation responsive to determining the second area overlaps the region, wherein the second scale space representation is a lower resolution representation than the first scale space representation.

18. The method of claim 13, wherein the image data includes the first scale space representation of the multiple scale space representations, and further comprising generating the second scale space representation of the multiple scale space representations based on the first scale space representation.

19. The method of claim 13, wherein the first scale space representation corresponds to a 1080p resolution, wherein the second scale space representation comprises a downsampled version of the first scale space representation, the second scale space representation generated based on a scaling factor, and wherein the scaling factor is five.

20. The method of claim 13, wherein the image data corresponds to the first scale space representation, and further comprising receiving at the processor, from a second image sensor, second image data of the scene, the second image data corresponding to the second scale space representation.

21. The method of claim 13, further comprising generating a mask of the search area, the mask comprising a plurality of regions, wherein each of the plurality of regions corresponds to a value indicative of a probability of detecting the object in the corresponding region, and wherein performing object detection in the search area is based at least in part on one or more values corresponding to the plurality of regions.

22. The method of claim 13, wherein the second scale space representation comprises a downsampled version of the first scale space representation.

23. The method of claim 22, wherein the downsampled version is generated based on a scaling factor, and wherein the scaling factor is two.

24. The method of claim 13, wherein the location data corresponds to one or more areas of a three-dimensional (3D) map, and wherein the location data is also associated with a location of the object provided by a location sensor.

25. An apparatus comprising:
 means for receiving image data of a scene including an object, the image data associated with multiple scale space representations of the scene, the multiple scale space representations including a first scale space representation and a second scale space representation, wherein the first and second scale space representations are associated with different distances in a same direction from an image sensor and different resolution images of the same field of view of the scene; and
 means for processing, wherein the means for processing is configured to:
  identify a search area of a sub-region of one or more multiple scale space representations of the scene based on an overlap of a region indicated by location data associated with the object and one or more areas associated with the one or more of the multiple scale space representations of the scene; and
  perform object detection in the search area of the one or more of the multiple scale space representations of the scene.

26. The apparatus of claim 25, further comprising:
 means for generating the location data; and
 means for generating the image data.

27. The apparatus of claim 25, wherein the means for receiving and the means for processing are incorporated into a vehicle.

28. A computer-readable storage device storing instructions to detect an object, the instructions executable by a processor to cause the processor to:
 receive, from an image sensor, image data of a scene including an object, the image data associated with multiple scale space representations of the scene, the multiple scale space representations including a first scale space representation and a second scale space representation, wherein the first and second scale space representations are associated with different distances in a same direction from an image sensor and different resolution images of the same field of view of the scene;
 receive location data associated with the object;
 identify a search area of a sub-region of one or more multiple scale space representations of the scene based on an overlap of a region indicated by the location data and one or more areas associated with the one or more of the multiple scale space representations of the scene; and
 perform object detection in the search area of the one or more of the multiple scale space representations.

29. The computer-readable storage device of claim 28, wherein the first scale space representation is selected based on a determination that a first area associated with the first scale space representation overlaps the region, and wherein the instructions are further executable by the processor to cause the processor to:
 determine whether a second area associated with the second scale space representation of the multiple scale space representations overlaps the region;
 receive second location data associated with a second object, the second object included in the scene;
 determine whether a third area associated with a third scale space representation of the multiple scale space representations overlaps a second region associated with the second object and indicated by the second location data, the third scale space representation comprising a downsampled version of the first scale space representation; and
 in response to a determination that the third area overlaps the second region:
  identify a second search area of the third scale space representation based on the overlap of the third area and the second region; and
  perform object detection in the second search area of the third scale space representation.

* * * * *